United States Patent [19]

Ches et al.

[11] Patent Number: 4,726,540
[45] Date of Patent: Feb. 23, 1988

[54] VARIABLE SENSITIVITY SEAT BELT RETRACTOR

[75] Inventors: Gregory S. Ches, Mt. Clemens; Richard D. Loose, Birmingham, both of Mich.

[73] Assignee: General Motors Corporation, Detroit, Mich.

[21] Appl. No.: 931,471

[22] Filed: Nov. 17, 1986

[51] Int. Cl.$^4$ .............................................. B60R 22/40
[52] U.S. Cl. ............................ 242/107.4 A; 280/803; 280/806
[58] Field of Search ............... 242/107.4 A; 280/803, 280/806; 297/478, 480

[56] References Cited

U.S. PATENT DOCUMENTS

| | | |
|---|---|---|
| 3,692,328 | 9/1972 | Arlauskas et al. |
| 3,694,002 | 9/1972 | Fancy |
| 3,727,943 | 4/1973 | Augunas et al. |
| 3,930,622 | 1/1976 | Tanaka et al. ............... 242/107.4 A |
| 4,010,093 | 7/1978 | Colasanti et al. ............ 242/107.4 A |
| 4,069,987 | 1/1978 | Fisher ........................ 242/107.4 A |
| 4,087,059 | 5/1978 | Lindblad .................... 242/107.4 A |
| 4,231,591 | 11/1980 | Close ....................................... 280/806 |
| 4,319,721 | 3/1982 | Kawai et al. ................ 242/107.4 A |
| 4,343,444 | 8/1982 | Francis ....................... 242/107.4 A |

*Primary Examiner*—John M. Jillions

*Attorney, Agent, or Firm*—Charles E. Leahy

[57] ABSTRACT

A door mounted seat belt retractor includes a pendulum having a support foot which is a generally planar surface having an elongated elliptical foot print with a major dimension and a minor dimension. A pendulum support member carried by the retractor has a planar support surface upon which the foot of the pendulum rests. The pendulum is oriented with the major dimension of its foot extending laterally of the vehicle body and the minor dimension extending longitudinally. The locking sensitivity of the retractor is varied so that a relatively smaller acceleration impulse experienced in the longitudinal direction will lock the retractor and a relatively higher acceleration impulse in the lateral direction will be required to lock the retractor. Thus, the retractor will not be locked by the level of acceleration experienced during routine door opening movement. The pendulum support member preferably has a planar support surface located at the bottom of an elongated elliptical well. The well has a major imension extending laterally of the vehicle and a minor dimension extending longitudinally of the vehicle and receives the elongated elliptical foot of the pendulum so that the pendulum is maintained in its proper orientation with the major dimension extending transversely of the vehicle.

4 Claims, 8 Drawing Figures

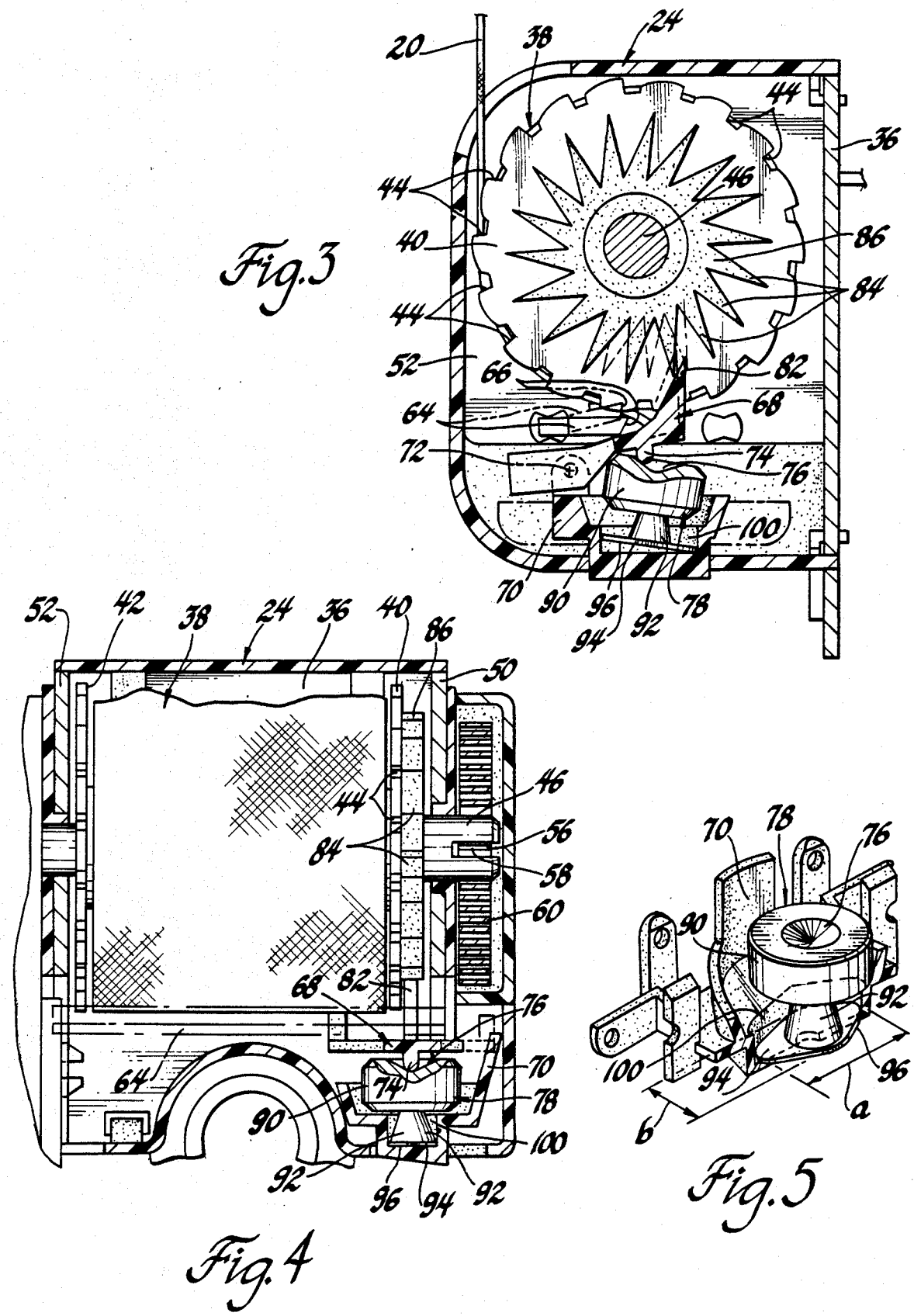

VARIABLE SENSITIVITY SEAT BELT RETRACTOR

The invention relates to a seat belt retractor and more particularly a door mounted inertia locking retractor which requires a higher level of acceleration to initiate retractor lockup in the lateral door opening direction than in the longitudinal direction.

BACKGROUND OF THE INVENTION

It is well known in passive seat belt systems to mount a seat belt retractor on the door so that outward swinging movement of the door will automatically move the restraint belt outwardly and forwardly with respect to the occupant seat in order to facilitate occupant ingress and egress. When the door is swung to the closed position, the belt is rewound on the retractor and thereby restored to a taut restraining condition about the seated occupant.

The prior art has recognized that a rapid opening movement of the door may induce an acceleration in excess of the 0.7 g's locking sensitivity which is mandated by Federal Motor Vehicle Safety Standard No. 208. If the seat belt retractor locks up during opening movement of the door, the door cannot be opened any further because the restraint belt is prevented from further unwinding from the retractor.

Thus, the prior art has proposed several devices which will actively prevent the retractor from locking up during a rapid door opening movement.

For example, Arlauskas U.S. Pat. Nos. 3,692,328, Fancy 3,694,002 and Augunas 3,727,943 teach the provision of a disablement mechanism between a door latch and a seat belt retractor to release the lock bar of the retractor from engagement with the reel and to block any subsequent locking of the lock bar when either the inside or outside door handle is actuated. This disablement is maintained, even if the door handles are released, as long as the door latch is unlatched.

Another approach to disabling a door mounted seat belt retractor is provided in Giffen U.S. Pat. No. 4,040,645 in which a plunger extends downwardly from the door mounted retractor and interacts with a ramp mounted on the door sill. Whenever the door is open, the plunger is extended and maintains the lock bar of the retractor in its unlocked position.

It would be desirable to provide a device for controlling the lock up of a door mounted inertia retractor without the addition of the added mechanisms required by the above-described prior art.

SUMMARY OF THE INVENTION

According to the invention, a door mounted seat belt retractor includes a pendulum having a support foot which is a generally planar surface having an elongated elliptical foot print with a major dimension and a minor dimension. A pendulum support member carried by the retractor has a planar support surface upon which the foot of the pendulum rests. The pendulum is oriented with the major dimension of its foot extending laterally of the vehicle body and the minor dimension extending longitudinally. The locking sensitivity of the retractor is varied so that a relatively smaller acceleration impulse experienced in the longitudinal direction will lock the retractor and a relatively higher acceleration impulse in the lateral direction will be required to lock the retractor. Thus, the retractor will not be locked by the level of lateral acceleration experienced during routine door opening movement. The pendulum support member preferably has the planar support surface located at the bottom of an elongated elliptical well. The well has a major dimension extending laterally of the vehicle and a minor dimension extending longitudinally of the vehicle and receives the elongated elliptical foot of the pendulum so that the pendulum is maintained in its proper orientation with the major dimension extending transversely of the vehicle.

Accordingly, the object, feature and advantage of the invention resides in the provision of a seat belt locking pendulum having an elongated elliptical foot print with the major dimension oriented laterally of the vehicle so that a relatively higher acceleration is required to lock the retractor in response to door opening movement and a relatively lower level of acceleration locks the retractor in the longitudinal direction.

A further object, feature and advantage resides in the provision of an elliptical elongated well on the pendulum support member of a seat belt retractor receiving an elongated elliptical foot of a pendulum and orienting the pendulum with the major dimension of the elliptical foot print oriented laterally of the vehicle so that the seat belt retractor will not be locked by a level of lateral acceleration experienced during door opening movement.

BRIEF DESCRIPTION OF THE DRAWINGS

These and other features, objects and advantages of the invention will become apparent upon consideration of the specification and the appended drawings in which:

FIG. 3 is a view similar to FIG. 2 but showing the pendulum of the seat belt retractor upset by an inertia force to initiate lock up of the seat belt retractor;

FIG. 4 is a frontal elevation view of the seat belt retractor of FIG. 2, having parts broken away and in section;

FIG. 5 is a perspective view of the pendulum and the pendulum support member;

DESCRIPTION OF THE PREFERRED EMBODIMENT

Figure 1:
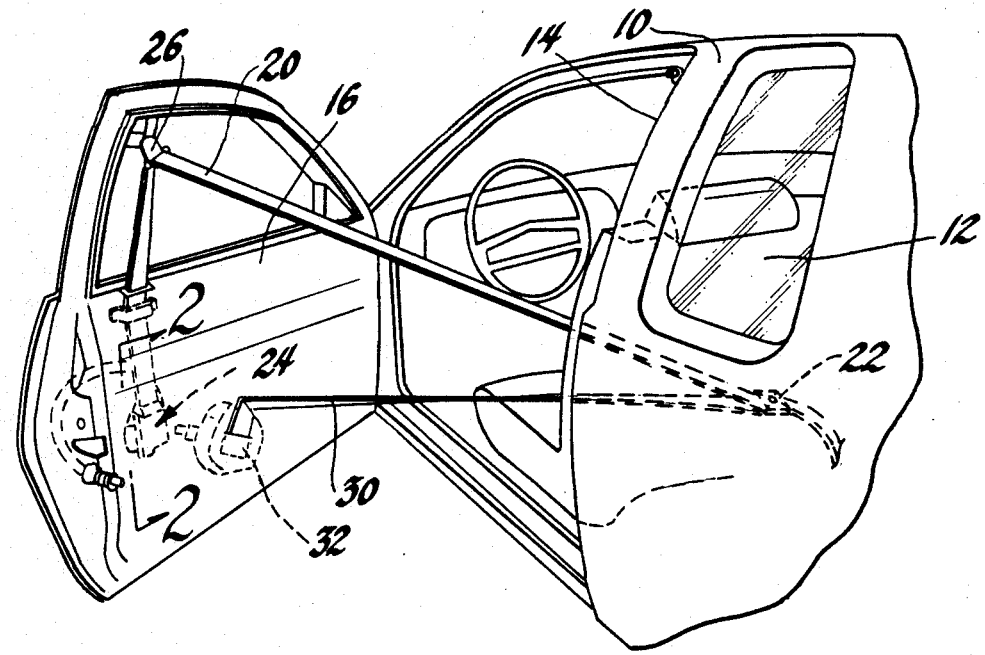
FIG. 1 is a perspective view of a vehicle body having a passive occupant restraint system including a door mounted lap belt and shoulder belt retractors.

Referring to FIG. 1, there is shown a vehicle body generally indicated at 10 having a vehicle seat 12 accessible through a door opening 14. A door 16 is hingedly mounted for closing the door opening 14 and has its forward edge hingedly mounted to the vehicle body to support the door 16 for swinging movement between an open position shown in FIG. 1 and a closed position not shown.

A passive seat belt system is provided for restraining the occupant in the seat 12. As seen in FIG. 1, the passive seat belt system includes a shoulder belt 20 having its inboard end mounted inboard the occupant seat by a release buckle 22 and its outboard end mounted on the door by a retractor 24. The shoulder belt 20 passes through a guide loop 26 located at the upper rear corner of the door so that the shoulder belt 20 is disposed diagonally across the occupant's torso when the door is closed. The passive seat belt system also includes a lap belt 30 having its inner end connected to the release buckle 22 and an outer end mounted by a lap belt retractor 32 mounted on the door 16. The shoulder belt retractor 24 and the lap belt retractor 32 each include a spring biased reel which winds the belt upon closing movement of the door so that the belt is established in a taut position about the seated occupant. Furthermore, the shoulder belt retractor 24 and the lap belt retractor 32 each have a pendulum actuated locking mechanism for locking the retractor in response to an acceleration condition so that the belt cannot be unwound from the retractor and will restrain the seated occupant in the vehicle seat.

Figure 2:
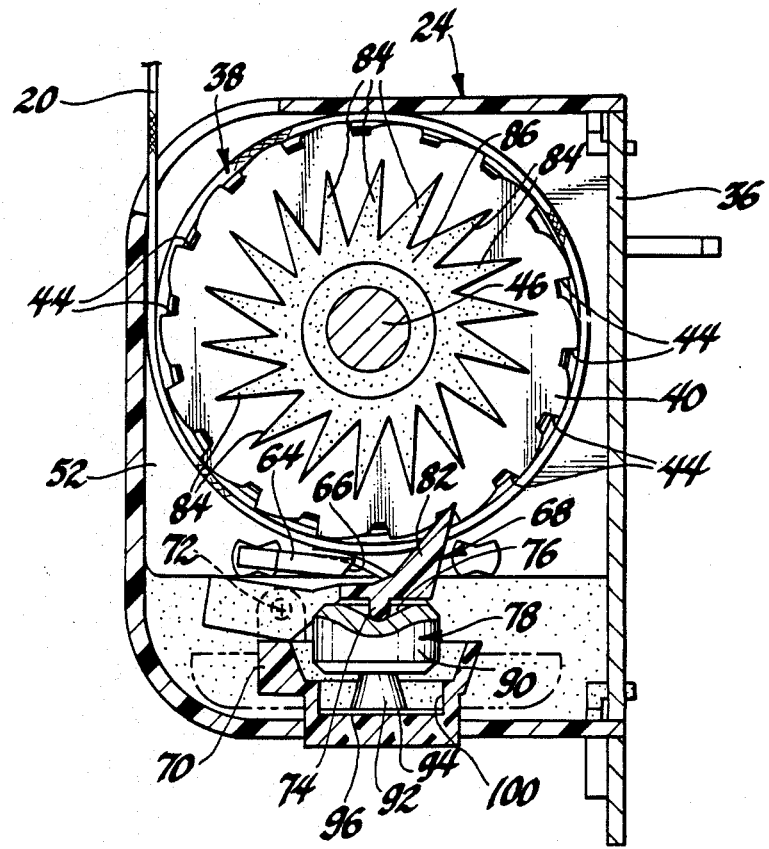
FIG. 2 is a side elevation view of the shoulder belt retractor taken in the direction of arrows 2—2 of FIG. 1.

Referring to FIGS. 2 and 4, it is seen that the shoulder belt retractor 24 includes a housing 36 which is suitably mounted on the vehicle door. A belt reel generally indicated at 38 has the shoulder belt 20 wound thereon. The reel 38 includes a pair of toothed plates 40 and 42 having teeth 44 displayed around the circumference thereof. The reel 38 includes a reel shaft 46 which extends between side walls 50 and 52 of the retractor to mount the reel for belt winding and unwinding rotation. As seen in FIG. 4, the right hand end of the shaft 46 has a slot 56 which receives the inner end 58 of a spiral spring 60. The outer end of the spiral spring 60, not shown, is suitably anchored on the housing so that the spiral spring 60 functions to rotate the belt reel 38 in the belt winding direction of rotation.

As best seen in FIG. 2, a lock bar 64 has its ends journaled on the side walls 50 and 52 of the housing and is movable from an at rest position in FIG. 2 to a phantom line indicated position of FIG. 3 in which the locking tooth 66 of the lock bar is carried into engagement of one of the teeth 44 of the ratchet wheels 40 and 42 to lock the reel against belt unwinding rotation. In addition to the lock bar 64, this retractor locking mechanism includes a pilot pawl 68 which is pivotally mounted on a pendulum support 70 for rotation about a pivot axis 72. The pilot pawl 68 includes a follower 74 which rests in a conical depression 76 of a pendulum 78 which rests upon the pendulum support 70. As best seen by comparing FIGS. 2 and 3, an acceleration stimulus experienced by the retractor upsets the pendulum 78 from its rest position of FIG. 2 to its excited position of FIG. 3 in which the pilot pawl 68 is pivoted upwardly so that a tooth 82 thereof engages with a tooth 84 of a sprocket wheel 86 carried by the reel 38. Accordingly, as seen in FIG. 3, a slight unwinding rotation of the reel 38 by the belt 20 causes the tooth 84 to further pivot the pilot pawl 68 to its phantom line indicated position of FIG. 3 in which the pilot pawl 68 will in turn raise the lock bar 64 to the phantom line indicated position of FIG. 3 thereby locking the reel 38 against any further rotation in the belt unwinding direction.

According to the invention, the pendulum 78 and the pendulum support 70 are especially configured to vary the sensitivity of the inertia sensor. More particularly, the pendulum 78 includes an inertia mass 90 which is mounted atop a conical shaped pedestal 92. The pedestal 92 has a support foot 94 having a planar bottom surface 96 which has a elongated elliptical foot print, as best seen in FIG. 5. The foot 94 of the pendulum fits closely within the confines of a well 100 provided in the pendulum support 70. The well has an elongated elliptical shape which closely mates with the foot 94 of the pendulum in a slip fitting relationship therewith.

The retractor 24 is mounted in the vehicle door with the major dimension of the elongated elliptical foot 94 (as indicated by dimension "a" in FIG. 5) oriented in a direction laterally of the vehicle body. The minor dimension of the elongated elliptical foot 94 (designated "b" in FIG. 5) is oriented longitudinally of the vehicle body. Accordingly, as best seen by comparing FIGS. 3 and 4, it will be appreciated that a substantially larger acceleration impulse acting in the lateral direction will be required to upset the pendulum than would be required in the longitudinal direction of the vehicle.

Figure 6:
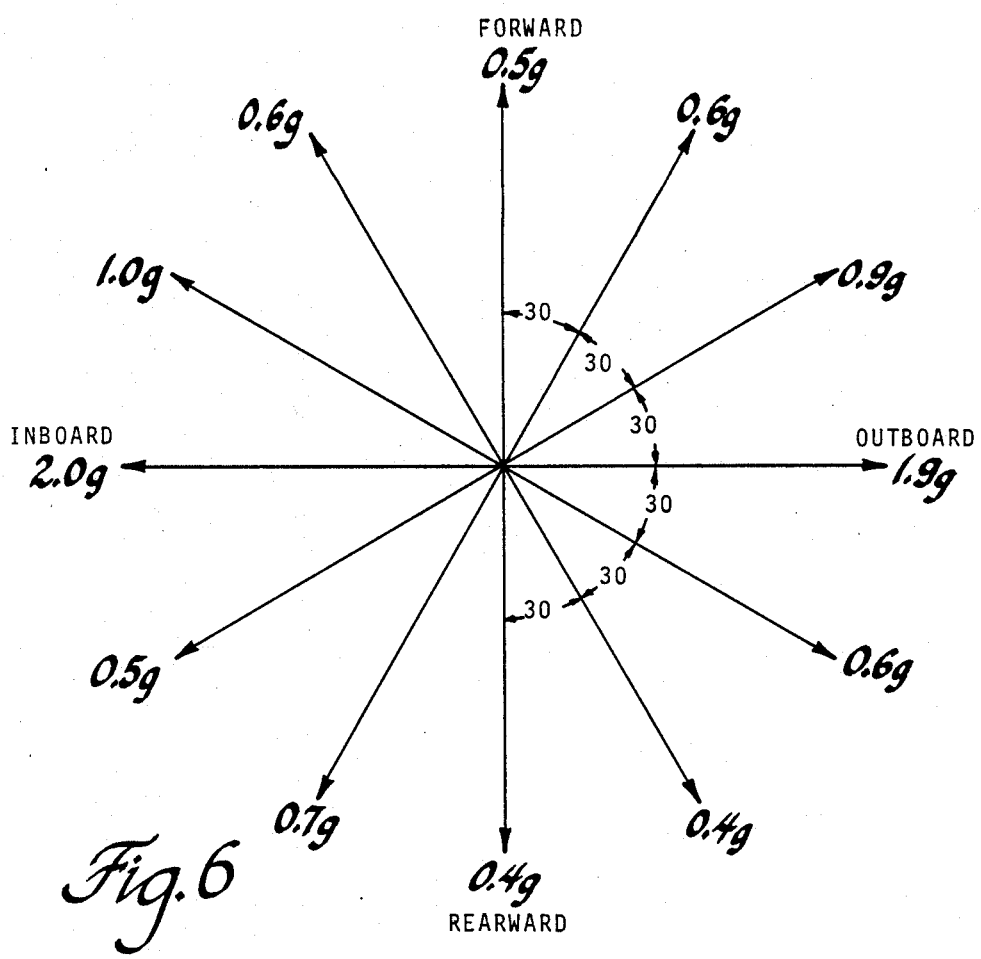
FIG. 6 is a plot showing the sensitivity of the seat belt retractor in response to accelerations imposed from various angular directions.

Referring to FIG. 6, there is shown a plot of test results for a typical and desirable pendulum. The plot shows that an acceleration of 0.5 g's in the forward direction longitudinally of the vehicle or 0.4 g's in the rearward direction will upset the pendulum and lock up the retractor. The plot also shows that a lateral acceleration of either 2.0 g's inboard or 1.9 g's outboard of the vehicle will upset the pendulum. Accordingly, in the longitudinal direction the retractor will lock up at less than the 0.7 g's threshold specified in the MVSS 208, while in the lateral direction the retractor will not lock up at the 1.5 g level which can be experienced during movement of the door 16 between its open and closed position. The plot in FIG. 6 also shows the g sensitivity of the pendulum at 30° increments of acceleration input between the longitudinal and lateral directions. It will be understood that the sensitivity of the pendulum at these different angles of input can be controlled to some extent by tailoring the elongated elliptical shape of the foot print of the pendulum.

As best seen in FIG. 5, it will be appreciated that the close slip fitting relationship between the foot 94, the pendulum 78 and the well 100 of the support member 70 will function to prevent the pendulum 76 from turning within the pendulum support so that the pendulum 76 will be maintained with the major dimension of its foot print extending laterally of the vehicle and the minor dimension of the foot print extending longitudinally of the vehicle.

Figure 7:
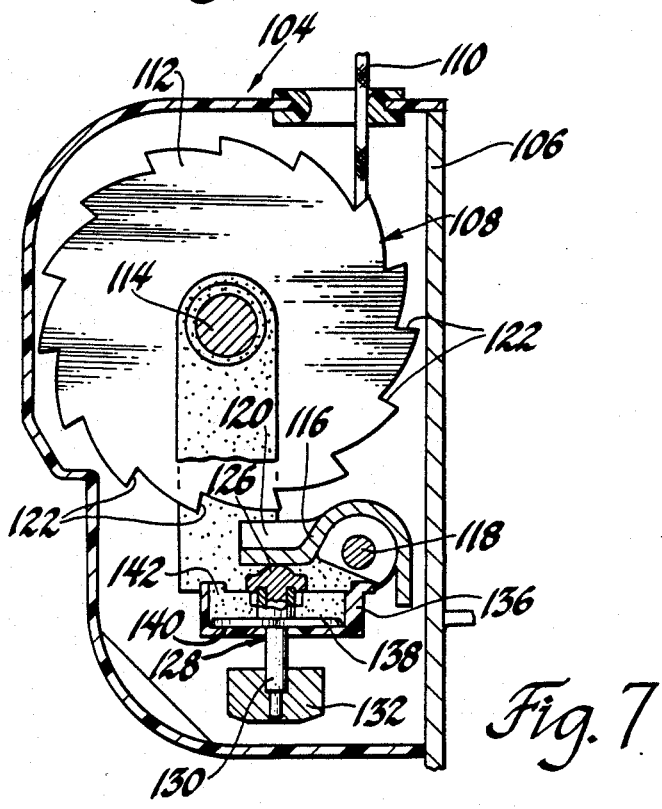
FIG. 7 is a side elevation view of a second embodiment of the invention in which the pendulum is a suspended pendulum instead of the standing pendulum shown in the embodiment of FIGS. 2-5.
Figure 8:
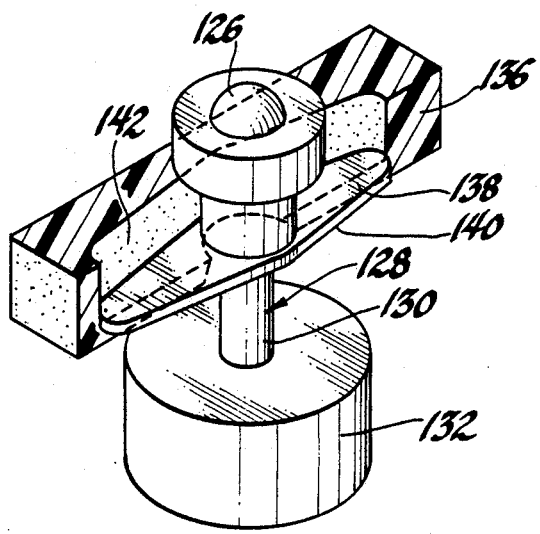
FIG. 8 is a perspective view of the pendulum and the pendulum support.

Referring to FIGS. 7 and 8, there is shown a second embodiment of the invention employing a somewhat different pendulum actuated locking mechanism according to the invention. As seen in FIG. 7, the seat belt retractor generally indicated at 104 includes a housing 106 which is suitably mounted on the vehicle door. A belt reel generally indicated at 108 has the belt 110 wound thereon. The reel 108 includes a pair of toothed ratchet plates, one of which is designated 112, and is rotatably mounted on the housing 108 by a reel shaft 114. A winding spring, not shown, rotates the reel shaft 114 in reel 108 in the clockwise belt winding direction of rotation.

A lock bar 116 is pivotally mounted on the housing 106 by a pivot shaft 118. The lock bar 116 is movable from the rest position of FIG. 7 upwardly to carry a locking tooth 120 thereof into engagement with one of a plurality of locking teeth 122 carried on the tooth plate 112 to lock the belt reel 108 against belt winding rotation.

As best seen in FIG. 7, the lock bar 116 rests upon the head 126 of a pendulum 128. The pendulum 128 includes a stem 130 which connects the head 126 with a depending inertia mass 132. The pendulum 128 is mounted on a retractor by a pendulum support 136.

According to the invention, the pendulum 128 and the pendulum support 136 are especially configured to vary the sensitivity of the inertia sensitive locking mechanism. More particularly, the pendulum 128 has a foot 138, best seen in FIG. 8, which has a planar bottom surface 140 which has an elongated elliptical foot print. The stem 130 of the pendulum extends through an aperture in the pendulum support 136. The foot 138 of the pendulum 128 fits closely within the confines of a well 142 provided in the pendulum support 136. The well has an elongated elliptical shape which closely mates with the foot 138 of the pendulum in a slip fitting relationship therewith.

The retractor 104 is mounted in the vehicle door with the major dimension of the elongated elliptical foot 138 oriented in a direction laterally of the vehicle body. The minor dimension of the elliptical foot 138 is oriented longitudinally of the vehicle body. Accordingly, it will be appreciated that a substantially larger acceleration impulse acting in the lateral direction will be required to upset the pendulum than would be required in the longitudinal direction. Accordingly, the shape of the elliptical foot 138 and the well 142 of the pendulum support 136 can be tailored to provide an inertia sensitive locking mechanism which will lock the retractor in response to a relatively small acceleration impulse in the longitudinal direction but will require a relatively larger acceleration impulse in the lateral direction so that the retractor will not be inadvertently locked by the acceleration forces acting thereon during normal opening and closing movement of the door.

Thus it is seen that the invention provides a new and improved seat belt retractor which will prevent the retractor from locking up during a rapid door opening and closing movement.

The embodiments of the invention in which an exclusive property or privilege is claimed are defined as follows:

1. In a seat belt retractor adapted for mounting on a vehicle door and having a belt reel and a reel locking mechanism activated by an inertia mass sensor for locking the reel against belt unwinding rotation in response to a predetermined acceleration condition, an improvement for reducing the sensitivity of the inertia mass sensor in the lateral direction of door movement, comprising:
   a support member carried by the retractor for supporting the inertia sensor mass and having a generally planar inertia mass supporting surface;
   and the inertia mass having a support resting on the supporting surface of the support member, said support of the inertia mass having a generally elliptical elongated configuration oriented with the major dimension extending laterally of the vehicle and the minor dimension extending longitudinally of the vehicle whereby the locking sensitivity of the retractor is varied between the predetermined level of acceleration in the longitudinal direction and a somewhat higher level of acceleration in the lateral direction of door opening movement so that the retractor is not locked by the level of acceleration experienced during door opening movement.

2. The retractor of claim 1 further characterized by means acting between the support of the inertia mass and the support member and adapted to maintain the selected orientation of the inertia mass with the major dimension extending laterally of the vehicle and the minor dimension extending longitudinally of the vehicle.

3. In a seat belt retractor adapted for mounting on a vehicle door and having a belt reel and a reel locking mechanism activated by an inertia mass sensor for locking the reel against belt unwinding rotation in response to a sensed acceleration condition of predetermined level less than the level experienced by the retractor during door opening and closing movement, an improvement for reducing the sensitivity of the inertia mass sensor in the lateral direction of door movement, comprising:
   a pendulum having an inertia mass mounted atop a pedestal, said pedestal having a generally planar foot at the bottom thereof having an elongated elliptical footprint with a major dimension and a minor dimension;
   a pendulum support member carried by the retractor and having a planar support surface located at the bottom of an elongated elliptical well having a major dimension extending laterally of the vehicle and a minor dimension extending longitudinally of the vehicle;
   said pendulum being carried by the pendulum support with the foot of the pendulum standing in the well of the pendulum support member so that the pendulum remains oriented with the major dimension of the foot extending laterally of the vehicle and the minor dimension of the foot oriented longitudinally whereby the locking sensitivity of the retractor is varied between the predetermined level of acceleration in the longitudinal direction and a somewhat higher level of acceleration in the lateral direction of door opening movement so that the retractor is not locked by the level of acceleration experienced during door opening movement.

4. In a seat belt retractor adapted for mounting on a vehicle door and having a belt reel and a reel locking mechanism activated by an inertia mass sensor for locking the reel against belt unwinding rotation in response to an a sensed acceleration condition of predetermined level less than the level experienced by the retractor during normal door opening movement; an improvement for reducing the sensitivity of the inertia mass sensor in the lateral direction of door movement so that the retractor locking mechanism will not lock during normal door opening movement, comprising:
   a pendulum having an inertia mass suspended from a stem, said stem having a generally planar support foot thereof having an elongated elliptical footprint with a major dimension and a minor dimension;
   a pendulum support member carried by the retractor and having a planar support surface located at the bottom of an elongated elliptical well having a major dimension extending laterally of the vehicle and a minor dimension extending longitudinally of the vehicle, said support member having an aperture in the planar support surface for receiving the stem of the pendulum;
   said pendulum being carried by the pendulum support with the foot of the pendulum supported in the well of the pendulum support member so that the pendulum remains oriented with the major dimension of the foot extending laterally of the vehicle and the minor dimension of the foot oriented longitudinally whereby the locking sensitivity of the retractor is varied between the predetermined level of acceleration in the longitudinal direction and a level of acceleration in lateral direction somewhat higher than the predetermined level so that the retractor locking mechanism is not locked by the level of lateral acceleration experienced during door opening movement.

* * * * *